(12) United States Patent
Diana et al.

(10) Patent No.: US 6,880,987 B2
(45) Date of Patent: Apr. 19, 2005

(54) PAN AND TILT POSITIONING UNIT

(75) Inventors: Carl Christopher Diana, Round Lake, IL (US); Daniel Allen Cloud, Glenview, IL (US); Daniel Mark Mullin, Colorado Springs, CO (US); Raymond L. Bratton, Addison, IL (US)

(73) Assignee: Quickset International, Inc., Northbrook, IL (US)

( * ) Notice: Subject to any disclaimer, the term of this patent is extended or adjusted under 35 U.S.C. 154(b) by 0 days.

(21) Appl. No.: 10/465,030

(22) Filed: Jun. 19, 2003

(65) Prior Publication Data

US 2004/0042783 A1 Mar. 4, 2004

Related U.S. Application Data

(60) Provisional application No. 60/390,070, filed on Jun. 21, 2002.

(51) Int. Cl.$^7$ .............................................. G03B 17/00
(52) U.S. Cl. ...................... 396/427; 348/143; 348/211.1
(58) Field of Search ......................... 348/211.99, 211.1, 348/211.3, 211.4, 211.6, 211.9, 211.11, 143, 159; 396/427

(56) References Cited

U.S. PATENT DOCUMENTS

| | | | |
|---|---|---|---|
| 3,984,628 A | 10/1976 | Sharp | 348/211.8 |
| 4,414,576 A * | 11/1983 | Randmae | 348/373 |
| 5,111,288 A | 5/1992 | Blackshear | 348/143 |
| 5,418,567 A | 5/1995 | Boers et al. | 348/375 |
| 5,455,625 A * | 10/1995 | Englander | 348/375 |
| 5,583,565 A | 12/1996 | Cortjens et al. | 348/14.1 |
| 5,633,681 A | 5/1997 | Baxter et al. | 348/373 |
| 5,835,140 A | 11/1998 | Nakamura et al. | 348/211.2 |
| 5,963,250 A | 10/1999 | Parker et al. | 348/211.6 |
| 6,008,837 A | 12/1999 | Yonezawa | 348/211.8 |
| 6,019,524 A | 2/2000 | Arbuckle | 396/427 |
| 6,084,631 A * | 7/2000 | Tonkin et al. | 348/211.6 |
| 6,124,892 A | 9/2000 | Nakano | 348/373 |
| 6,130,704 A | 10/2000 | Ely et al. | 348/143 |
| 6,144,406 A | 11/2000 | Girard et al. | 348/211.4 |
| 6,262,768 B1 * | 7/2001 | Williams | 348/217.1 |
| 6,356,308 B1 | 3/2002 | Hovanky | 348/373 |
| 6,357,936 B1 * | 3/2002 | Elberbaum | 396/427 |
| 6,445,410 B1 * | 9/2002 | Kawano | 348/211.1 |
| 2002/0191080 A1 * | 12/2002 | Terada et al. | 348/207.1 |
| 2003/0095190 A1 * | 5/2003 | Mizutani et al. | 348/211.1 |

* cited by examiner

Primary Examiner—W. B. Perkey
(74) Attorney, Agent, or Firm—Pauley Petersen & Erickson

(57) ABSTRACT

A pan and tilt unit includes a platform for accommodating a device and a housing connected to the platform. A drive system is positioned within the housing and is adapted to move the platform in a desired direction. A plurality of drivers is further positioned within the housing in communication with the drive system and the device to append an internal operation protocol to a device operation protocol thereby permitting operation of the device by the pan and tilt unit.

36 Claims, 8 Drawing Sheets

PAN AND TILT POSITIONING UNIT

This application claims the benefit of provisional 60/390,070 filed on Jun. 21, 2002.

BACKGROUND OF INVENTION

1. Field of the Invention

This invention relates to a pan and tilt unit for enabling selected devices to move in a predetermined and/or selectable path.

2. Description of Related Art

Pan and tilt units, such as those described herein, are commonly housings that support one or more devices. The pan and tilt unit enables such devices to move in a predetermined and/or selectable path. The pan and tilt unit according to this invention is preferably used in connection with a camera but may be used in connection with other devices that require both a panning and tilting motion, including thermal imaging equipment, lasers, antennas and/or any such similar device. Pan and tilt units are commonly used in connection with monitoring systems for security, control, interaction, measurement and other applications requiring active or passive monitoring of a particular environment.

SUMMARY OF THE INVENTION

It is one object of this invention to provide a pan and tilt unit that can accommodate a wide variety of devices, independent of manufacturer or communications capability.

It is one object of this invention to provide a pan and tilt unit that can effectively convert an "off-the-shelf" RS232 camera to an individually addressable RS485 camera.

It is another object of this invention to provide a pan and tilt unit that can withstand a variety of adverse environmental conditions.

A pan and tilt unit according to a preferred embodiment of this invention includes a housing and a platform connected to the housing, the platform for accommodating a device, such as a camera housing and/or camera. A drive system is positioned within the housing and adapted to move the platform in a desired direction. A control system is further positioned within the housing in communication with the drive system and the device to append an internal operation protocol to a device operation protocol thereby permitting operation of the device by the pan and tilt unit.

The control system may further include an integrated programmable control system that stores one or more predetermined tours for moving the device in a desired sequence of motion. In addition, the control system may include one or more internal motor drivers positioned within the housing. According to one embodiment of a pan and tilt unit used in connection with a camera, four internal motor drivers are positioned within the housing including: a pan motor driver for controlling the pan and tilt unit in a pan direction; a tilt motor driver for controlling the pan and tilt unit in a tilt direction; a zoom motor driver for controlling magnification of a lens of the device; and a focus motor driver for controlling focus of the lens of the device.

The pan and tilt unit may further include a device enclosure positioned on the platform for accommodating the device. According to various embodiments of this invention, the device enclosure may further include a universal mounting mechanism within the device enclosure; two devices positioned within the device enclosure, each device of the two devices positioned in an end of the device enclosure; a slideable shelf positioned within the device enclosure, the slideable shelf fully extendible outside of the device enclosure; a socket integrated within the device enclosure, the socket connectable with the device upon placement of the device within the device enslosure; a blower positioned within the device enclosure, the blower generating an air screen across an output end of the device enclosure; and/or an intake air filter positioned within the device enclosure at an opposite end of the device enclosure from the blower.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Pan and tilt unit 10 according to various preferred embodiments of this invention are shown in FIGS. 1–12. As used throughout the specification and claims, the term "pan and tilt unit" describes an apparatus for imparting rotational and/or tilting motion onto an attached device 50, such as camera 55. Applicants intend that pan and tilt unit 10 may be used in connection with numerous devices, however, a camera is used as an example of such a device throughout the specification and claims. As described above, device 50 may further include any other controllable instrument including tracking systems, thermal imaging equipment, lasers, antennas and/or any such similar devices.

Figure 4:
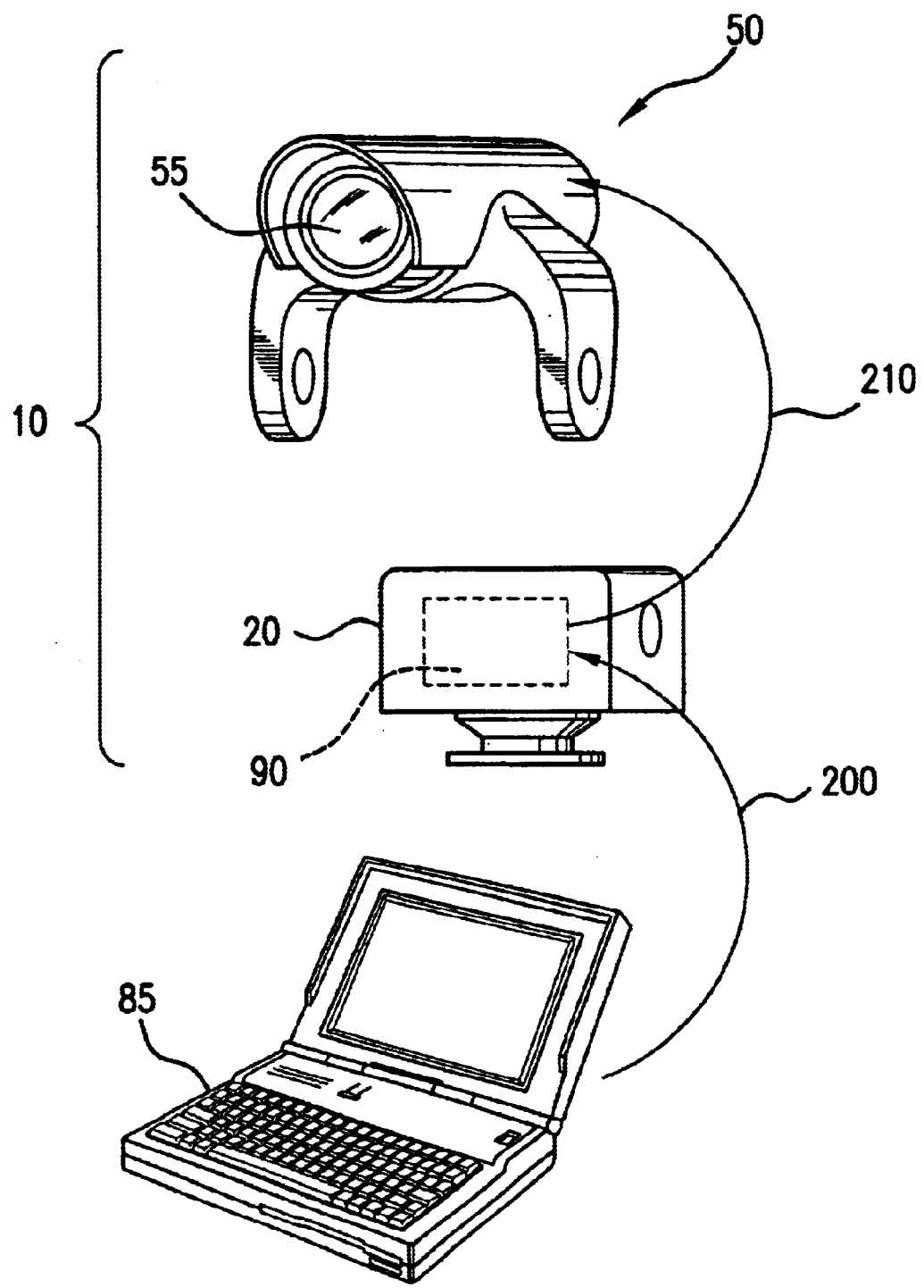
FIG. 4 is a schematic view of a pan and tilt unit and camera combination according to one preferred embodiment of this invention.

Pan and tilt unit 10 is preferably adaptable for use in connection with any number of devices and any number of particular brands of such devices. To facilitate such adaptation to any number of devices, pan and tilt unit 10 according to this invention includes a smart control system 90 that is RS232, RS422 and/or RS485 communication capable. FIG. 4 shows a schematic of pan and tilt unit 10 and a preferred device, such as a camera/lens.

Figure 1:
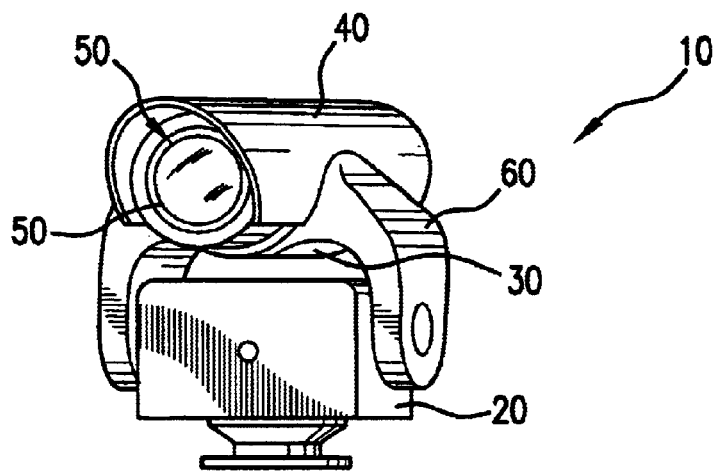
FIG. 1 is a front perspective view of a pan and tilt unit and camera combination according to one preferred embodiment of this invention.
Figure 2:
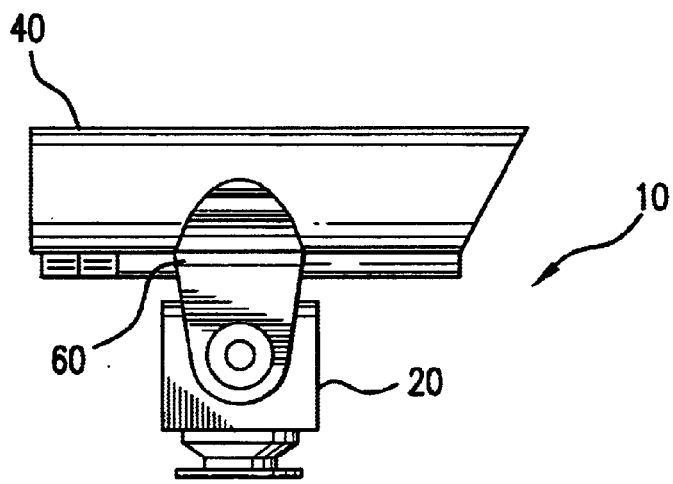
FIG. 2 is a side view of the pan and tilt unit and camera combination shown in FIG. 1.
Figure 3:
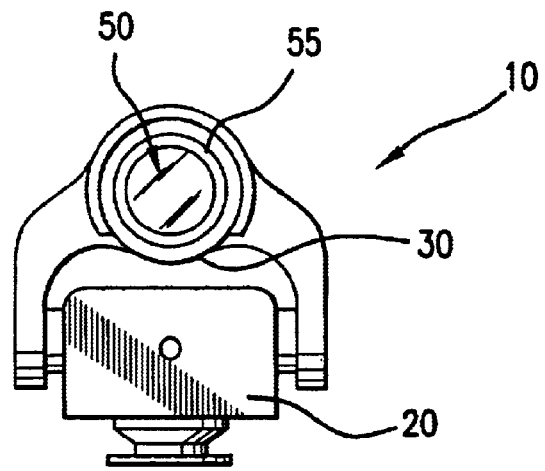
FIG. 3 is a front view of the pan and tilt unit and camera combination shown in FIG. 1.

According to one preferred embodiment of this invention and as shown in FIGS. 1–3, pan and tilt unit 10 comprises housing 20 and platform 30 connected to platform 20. Platform 30 accommodates device 50, such as camera 55, and is preferably mechanically connected to housing 20 to transmit any motion imparted by housing 20. Housing 20 and platform 30 are described in more detail below.

Figure 5:
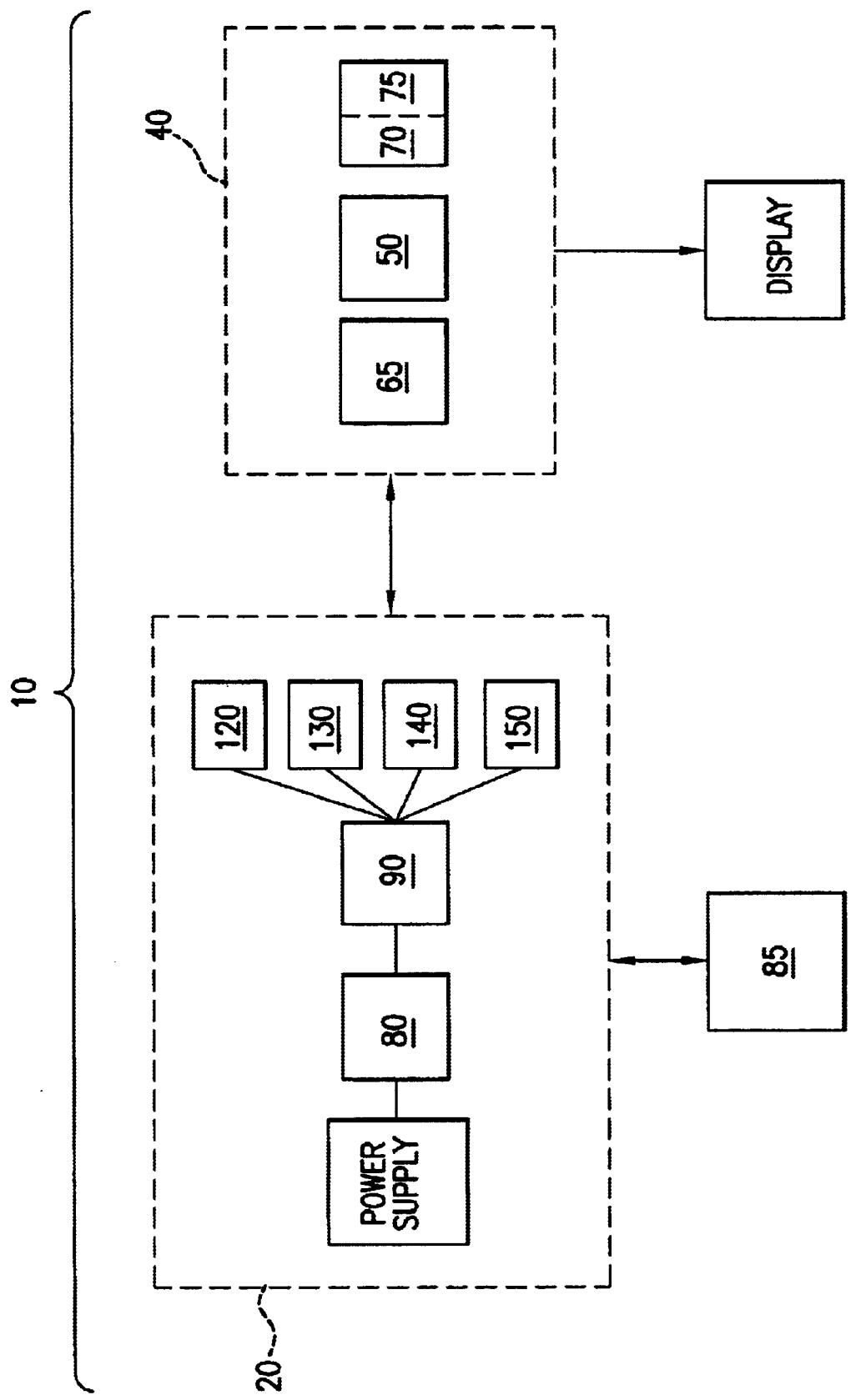
FIG. 5 is a block diagram of a pan and tilt unit and camera combination according to one preferred embodiment of this invention.
Figure 6:
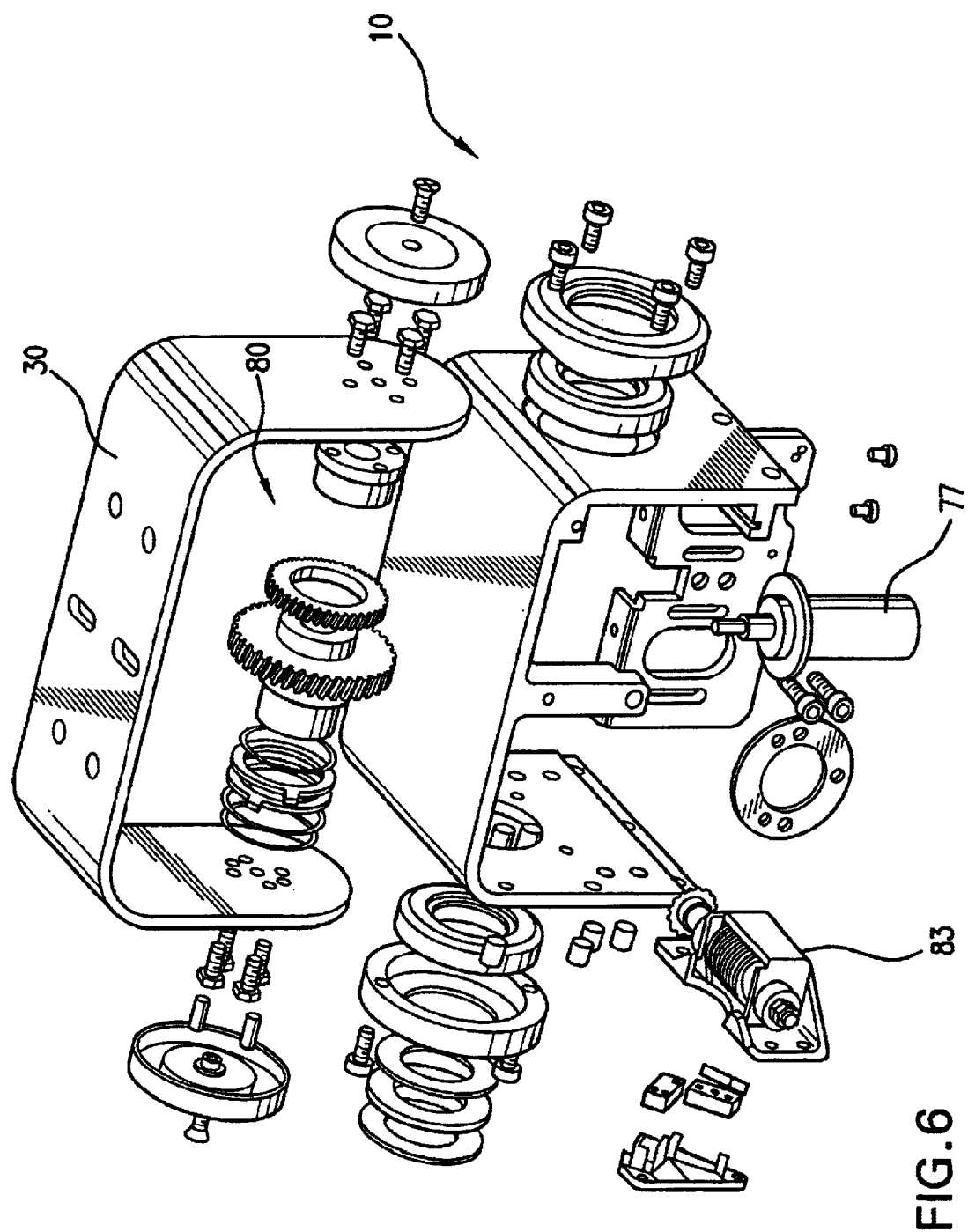
FIG. 6 is an exploded front perspective view of a portion of a pan and tilt unit according to one preferred embodiment of this invention.

As shown schematically in FIG. 5 and in detail in FIGS. 6"8, housing 20 further includes an integrated drive system 80 and control system 90 positioned within housing 20. Drive system 80 is adapted to move platform 30 in a desired direction based upon communications generated by control system 90.

According to a preferred embodiment of this invention shown schematically in FIG. 4, control system 90 positioned within housing 20 is in communication with drive system 90 and device 50 and appends an internal operation protocol 200 to a device operation protocol 210 thereby permitting operation of device 50 by pan and tilt unit 10.

In operation, control system 90 appends a prefix and a suffix to the device operation protocol 210 to permit communication with device 50. FIG. 4 shows a schematic of housing 20, camera 55 and input device 85, such as a computer having a graphical user input. Therefore, in operation, an operator provides an instruction from input device 85 to control system 90 within pan and tilt unit 10 with an internal operation protocol 200, also referred to as a pan and tilt protocol. The instruction is appended with a device operation protocol 210 or camera protocol within control system 90. The instruction is then routed from control system 90 to device 50 without the internal operation protocol 200. Device 50 then executes the instruction. In such a way, pan and tilt unit 10 can effectively convert an "off-the-shelf" RS232 camera to an individually addressable RS485 camera.

Control system 90 preferably further comprises one or more internal motor drivers positioned within housing 20, as shown schematically in FIG. 5. According to a preferred embodiment of pan and tilt unit 10 used in connection with camera 55, four internal drivers are positioned within housing 20. Specifically, the four internal motor drivers preferably include: pan motor driver 120 for controlling the pan and tilt unit in a pan direction; tilt motor driver 130 for controlling the pan and tilt unit in a tilt direction; zoom motor driver 140 for controlling magnification of a lens of the device; and focus motor driver 150 for controlling focus of the lens of the device. The plurality of drivers are in communication with drive system 80 and device 50 to append an internal operation protocol 200 to a device operation protocol 210 thereby permitting operation of the device 50 by pan and tilt unit 10.

Facilitating the operation of pan and tilt unit 10 with a variety of cameras are the plurality of internal motor drivers positioned within pan and tilt unit 10. Such motor drivers are preferably located on an electronic circuit board ("smart card") within pan and tilt unit 10. As described above, the motor drivers include pan motor driver 120 and tilt motor driver 130 for operation of pan and tilt unit 10 drive motors and zoom motor driver 140 and focus motor driver 150 for adaptive operation of device 50, specifically camera 55. In addition, the smart card may include power regulation and distribution features as well as controls and/or drivers for heaters and blowers.

As described, control system 90 uses a communication method that allows direct connection and control of any number of brands and/or models of camera and/or devices. Unique "commands" (instructions) in the pan and tilt unit "protocol" (menu of commands) may be used in combination with the commands for device 50, that allow pan and tilt unit 10 to identify and separate the instructions for device 50 and redirect them directly to device 50. As a result, the protocol for the particular device is appended with the internal operation protocol 200 ("pan and tilt protocol") and then transmitted in a form readable by device 50 and pan and tilt unit 10.

For example, in a particular application, such as a security camera on a street corner that requires a particular Hitachi camera, the Hitachi camera is mounted on pan and tilt unit 10 and connected to control system 90. When the operator wishes to control a specific pan and tilt unit 10 function such as pan, the "pan command" from the internal operation protocol 200 is sent to pan and tilt unit 10. When the operator wishes to control a specific camera function such as shutter speed, the "shutter speed command" from the device operation protocol 210 is appended with a specific prefix and suffix from the internal operation protocol 200, and sent to pan and tilt unit 10. Pan and tilt unit 10 recognizes the unique prefix and suffix, and redirects the command, minus the prefix and suffix, directly to the Hitachi camera. Therefore, any device 50 can be used without a change to the electronics within pan and tilt unit 10. One benefit of such operation is that device 50 operating with RS232 connectivity, that is not normally individually addressable may be made to be individually addressable as if operating with RS485 connectivity. In addition, the use of the proprietary protocol eliminates the need for a separate "interpreter" box that must be used in series with pan and tilt unit 10 and the programmer.

Pan and tilt unit 10 may further include an integrated programmable control system that stores one or more predetermined tours for moving device 50 in a desired sequence of motion. This integrated programmable control system further facilitates "plug and play" operation and permits the user to program predetermined pan, tilt and camera functions directly into pan and tilt unit 10, thus eliminating the need for an external control. The programmable control system is preferably configured to permit one or more preset pan, tilt, zoom and focus routines, a jogged pan and tilt and/or a direct entry of position coordinates for a pan and tilt routine called "tours". The control system according to one preferred embodiment of this invention is communications capable with HITACHI KP-D580, KP-D 590, KP-D20 A/B or similar HITACHI model cameras.

Figure 12:
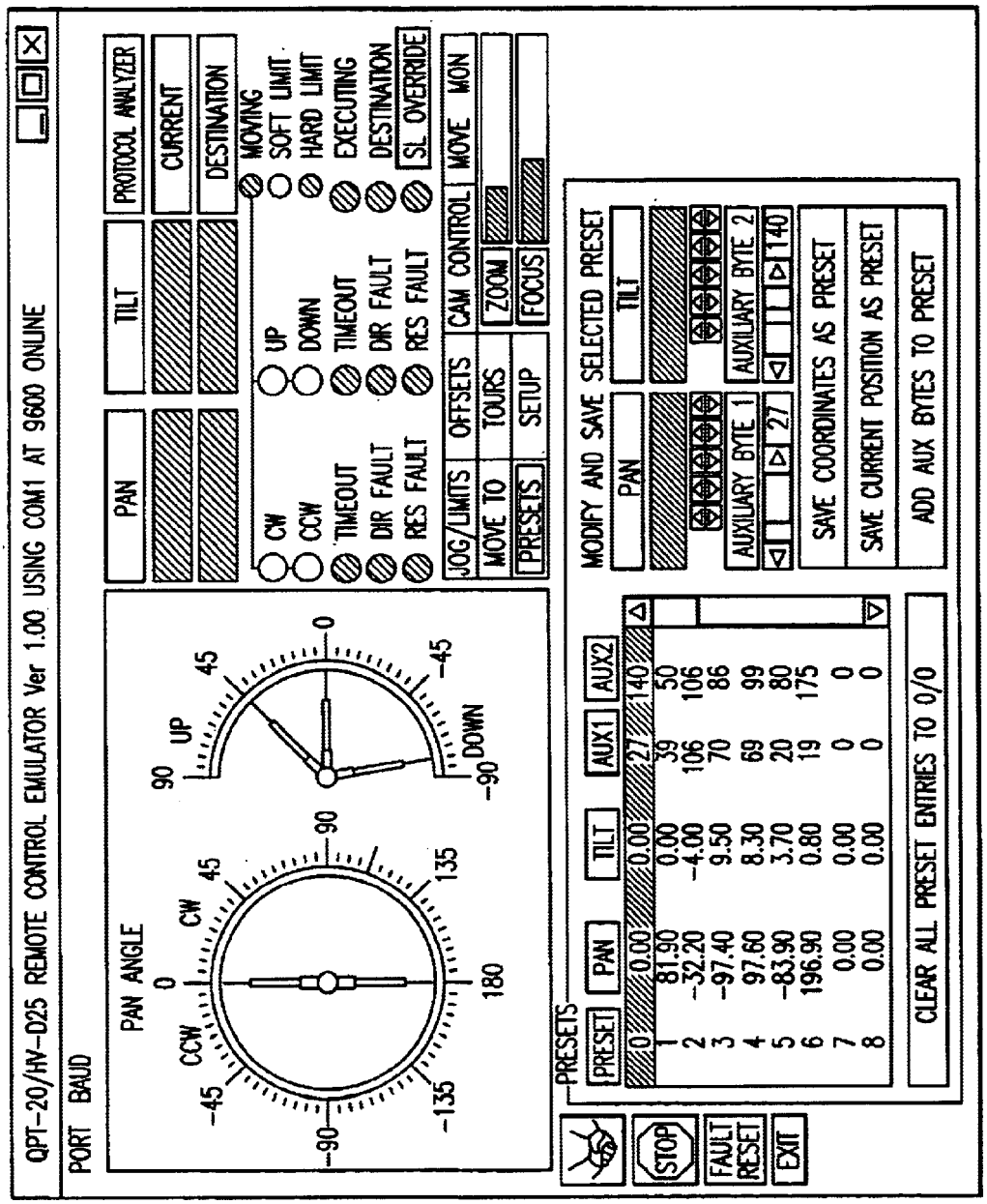
FIG. 12 is a sample screen shot of test software according to one preferred embodiment of this invention.

The integrated internal programmable control system may be tested, benchmarked or even configured using a test software package distributed in connection with pan and tilt unit 10. The test software preferably includes a number of features, all presented within an intuitive graphical interface, designed to confirm the interaction among pan and tilt unit 10, camera 55 and the programmable control system. The test software preferably operates within a generally acceptable operating system, such as Windows®, and incorporates serial standards and operating protocols, as described above. A screen shot showing an illustrative example of one preferred embodiment of the test software is shown in FIG. 12.

Preferred features of the test software include a "soft" motion limit settings for programmable motion limits that are within hard limits described below. The test software also includes a list of "preset positions" that includes a programmable group of pan, tilt, focus and/or zoom positions, such as shown in FIG. 12. Therefore, each preset list may include a pan rotation position (in degrees), a tilt rotation position (in degrees), a zoom (in times magnification or a related scale along a numerical range) and a focus (preferably adjusted to a numerical range). Analog and/or digital readouts of the pan position, the tilt position, zoom and/or focus are also preferable displayed or accessible within the test software.

The test software may additionally include various set-up options including preferences, options for redefining logic (i.e., clockwise scale to counterclockwise scale) and minimum and maximum speeds. Speeds may be defined and limited within a range to prevent binding at the low end and to prevent damage or excess wear to pan and tilt unit 10 and/or camera 55 at the high end.

One or more tours may be programmed from the preset list within the test software and saved for later recall and/or sequencing. The tours may include multiple preset steps and a programmable dwell time between each step. The tours are preferably written to memory within pan and tilt unit 10 following initial programming so that power outages/interruptions will not prevent resumption of the desired tour. The test software may further include programmable offsets for changing the perspective of the "home" or zero position of the Pan and tilt unit. For instance, if the Pan and tilt unit is mounted on a pole 5 degrees off center, the offset may be programmed at 5 degrees to normalize and therefore simplify further commands.

The test software may additionally include a movement monitor to display where pan and tilt unit 10 was programmed to move and where pan and tilt unit 10 actually moved. The results of the movement monitor may be logged and tracked to identify movement history and track degradation and/or interruptions in performance of pan and tilt unit 10. Such movement history may additionally provide an indication of whether the occurrence of a particular event was captured within the tour of pan and tilt unit 10.

Additionally, the test software may include pre-installed code/protocol for multiple, industry-standard cameras, therefore obviating the need for initial set-up of such cameras. In addition, test software may include a universal building/development tool for set-up and programming any camera model.

Timeouts and fault indicators may be included with the internal programmable control system and/or the test software to communicate with device 50 about whether the computer is still running and with the computer about whether device 50 is still running. As a result, commands may be executed to either continue running device 50 and/or computer, shut off device 50 and/or computer and/or vary the performance of device and/or computer.

Pan and tilt unit 10 preferably includes housing 20 that permits 435° degree (preferably ±217.5° degree from center) or continuous rotation capabilities and 180° degree (preferably ±90° degree) tilt rotation capabilities. Continuous rotation is preferably accomplished using electrical contact slip rings 77, shown in FIG. 6. In addition, housing 20 includes internal motors and/or gearing that permit 0° degree to 35° degree per second (variable) pan speed up to 0° degree to 100° degree per second (variable) pan speed or faster. Housing 20 will also permit 0° degree to 12° degree per second (variable) tilt speed. Pan and tilt movement is preferably repeatable to within 0.25° degree.

Figure 7:
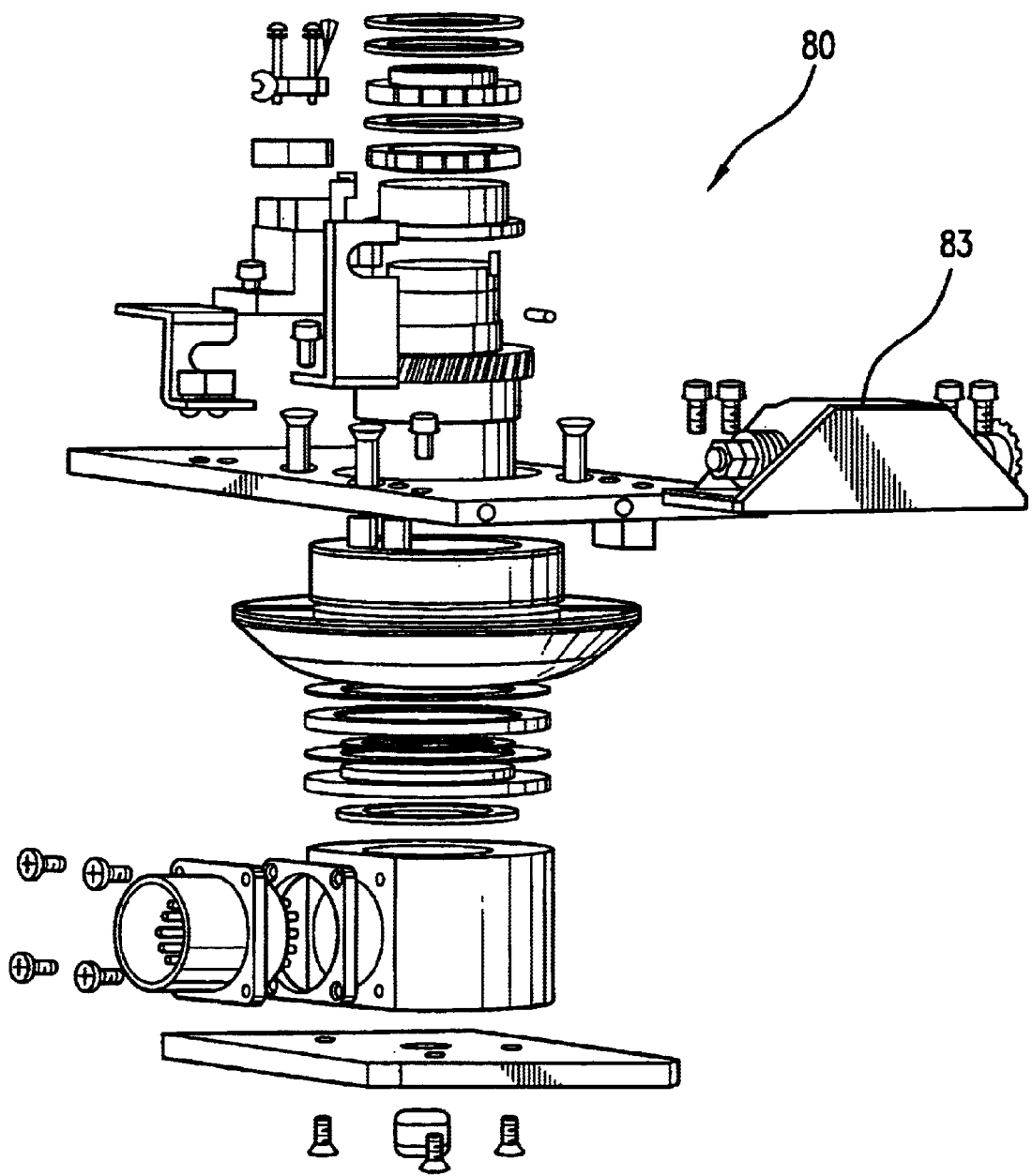
FIG. 7 is an exploded front perspective view of a portion of a pan and tilt unit according to one preferred embodiment of this invention.
Figure 8:
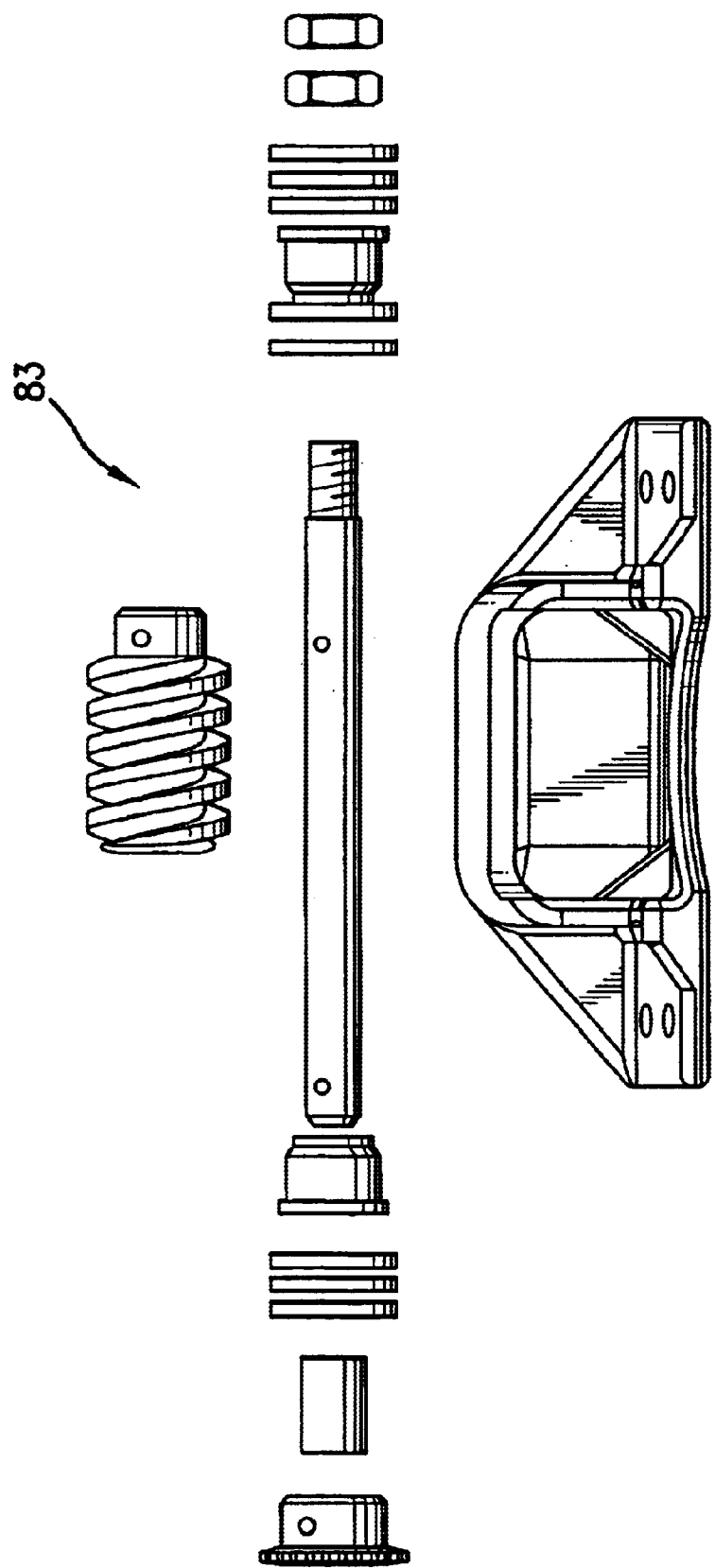
FIG. 8 is an exploded front view of a worm gear assembly according to one preferred embodiment of this invention.

Pan and tilt unit 10 preferably includes internal gearing, shown best in FIGS. 7 and 8, that accommodates adjustable hard limit switches for limiting a fixed range of motion for the pan and/or the tilt of pan and tilt unit 10. The trip rings are preferably adjustable clockwise and/or counterclockwise relative to the pan and/or tilt gearing to effect a physical hard limit switch within pan and tilt unit 10. Such limits may be useful in particular applications requiring that device 50 and/or pan and tilt unit 10 be limited to a particular range of motion, i.e. because of physical restrictions of the mounting environment. For pan and tilt units 10 configured with slip rings 77 and thus a 360° degree range of motion, the trip rings and, for pan rotation, limit switches are unnecessary.

According to a preferred embodiment of this invention, housing 20 includes an integral slot or notch for accommodating the smart card and/or associated electronics. This arrangement maintains the smart card and/or associated electronics in a rigid position relative to housing 20 and prevents/mitigates damage to the electronics from movement and/or shock produced by pan and tilt unit 10.

Housing 20 is preferably constructed using tamper resistant fasteners and concealed wiring and connections points. Traditionally, three wires must extend from pan and tilt unit 10 when used in connection with camera 55, including communication, AC or DC power and video. According to a preferred embodiment of this invention having an optimal mount, these wires do not extend outside of the pan and tilt unit 10 or the mounting environment. Shroud 60 may be used to overlay any wiring between housing 20 and device enclosure 40. Shroud 60 may be integrally formed with platform 30 to effect a unitary appearance of pan and tilt unit 10.

According to a preferred embodiment of this invention, housing 20 is constructed of structural materials that provide maximum torsional rigidity. In addition, housing 20 is preferably powder-coated and corrosion and weather resistant. In particular, housing 20 is preferably capable of withstanding wet and otherwise corrosive environments; high (+165 degree°) and/or low (−30 degree° F.) temperature environments; may operate in high winds (155+ mph); high humidity and/or any other possible environment suitable for pan and tilt unit 10 such as disclosed herein.

Platform 30 or tilt table is positioned outside of housing 20 of pan and tilt unit 10 and is operatively connected to the mechanical internals. Platform 30 may be a single piece, generally "U" shaped bracket connected with either side of housing 20, such as shown in FIG. 3, or is preferably formed with two separate end pieces extending from each side of housing 20 and connected between them with generally planar center piece. Platform 30 may include a groove and/or bracket for accepting device 50, such as camera 55 and/or device enclosure 40.

Security equipment generally runs on AC power however cameras 55 often operate on DC. Therefore, the pan and tilt unit 10 according to this invention preferably rectifies and regulates power internally within housing 20.

Pan and tilt unit 10 according to a preferred embodiment of this invention may include internal heater 65 for operation at low temperatures. In addition, or in the alternative, pan and tilt unit 10 may include a fan/blower 70 for operation in humid, wet and/or high temperature environments.

Pan and tilt 10 may further include device enclosure 40 adapted to housing 20. Device enclosure 40 preferably includes a universal mounting mechanism for accepting all styles and configurations of cameras 55 and/or other devices. The universal mounting mechanism preferably can accommodate virtually any device 50 having a footprint sufficient to fit within the device enclosure 40.

According to one preferred embodiment of this invention, device enclosure 40 comprises a rigid tube, such as an aluminum extrusion, having a gasketed opening that mates with platform 30 of pan and tilt unit 10. As a result of such a configuration, device 50 can be mounted directly within a mounting bracket on platform 40, preferably a slotted bracket that cooperates with a groove in device 50 or a grooved mounting plate mounted to device 50. This arrangement results in a rigid connection between device and pan and tilt unit 10, thereby reducing vibration imparted to device 50.

Device 50 for use with pan and tilt unit 10, such as camera 55, will require multiple connections including, for example, power, video connections and serial connections. Optimally, a socket, terminal strip or connector may be positioned within device enclosure 40 and/or the platform of pan and tilt unit 10 for quick and error-proof connection of the device with pan and tilt unit 10. The socket is preferably integrated within device enclosure 40 such that the socket is connectable with device 50 upon placement of device 50 within device enclosure 40. Cameras 55 typically require an adaptable lens having focus, zoom and iris control. Although cameras 55 are primarily discussed in this specification, pan and tilt unit 10 according to this invention may be used in connection with any number of devices 50 as discussed in the background of the invention.

Figure 9:
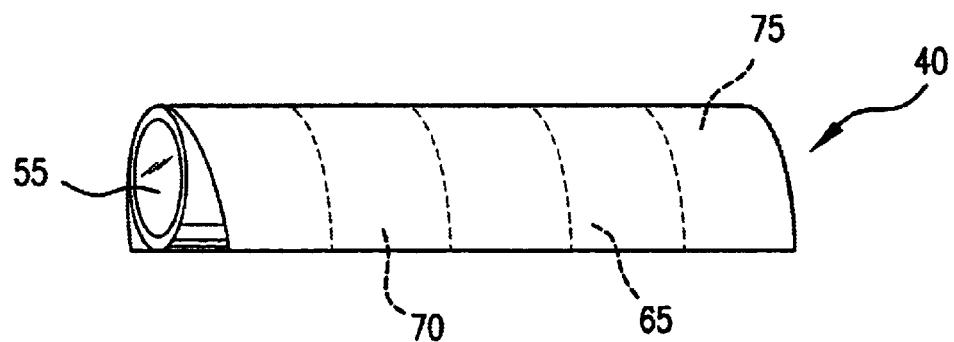
FIG. 9 is a schematic side view of a device enclosure according to one preferred embodiment of this invention.

As shown schematically in FIGS. 5 and 9, blower 70 may be positioned within device enclosure 40 to minimize condensation and facilitate an "air screen" which aids in the deflection of lens contaminants and accelerates evaporation of moisture on the lens window. Currently, blowers 70 typically run at a single speed using power supplied from camera 55. According to a preferred embodiment of this invention, blower 70 may be connected with respect to a control within pan and tilt unit 10 to enable switching power on blower 70 and/or varying speeds of blower 70. Device enclosure 40 may include blower 70 at one end, the lens and/or transparent cover at the opposite end and camera 55/device 50 in the enclosure space between. Blower 70 preferably directs air flow through the enclosure space and across the camera body to cool the electronics within the camera/lens, prevent moisture/humidity buildup within device enclosure 40 and maintain the air screen relative to the lens end of camera 55. The air flow is preferably dispersed through vents formed in the lens end of device enclosure 40. A traditional automotive type air filter 75 may be used relative to the intake side of blower 70 and/or device enclosure 40 to trap contaminants.

In addition, a sun shield may be positioned on or in association with pan and tilt unit 10 to protect device enclosure 40 and/or housing 20 from exposure to direct sun light to reduce heat build-up in and around device enclosure 40 and/or housing 20. As discussed above, pan and tilt unit 10 preferably includes corrosion resistant mechanicals and housings including internal worm gears 83 for continuous and durable operation.

According to one preferred embodiment of this invention, an additional feature of pan and tilt unit 10 is the ability to load device 50 such as camera 55 and lens assembly from either the front or the rear of device enclosure 40. Camera 55 and lens are typically attached to each other in the conventional manner to create a camera/lens assembly. The assembly is then mounted on a plate within device enclosure 40 which may be shelf 47 or bracket that slides into device enclosure 40, such as shown schematically in FIG. 11. Shelf 47 is preferably slideably positioned within device enclosure 40 so that shelf 47 is fully extendible outside of device enclosure 40 to facilitate repairs and adjustments to device 50. The camera/lens assembly should be mounted in a correct orientation that correlates to either front or rear loading of the assembly. The plate can be placed into device enclosure 40 either by removing the front lens cover, or by removing the fan/filter assembly.

Figure 10:
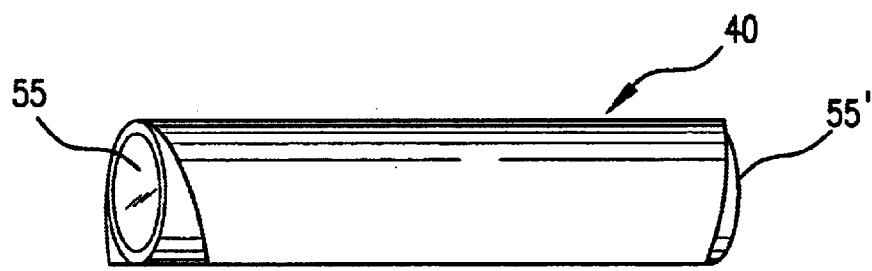
FIG. 10 is a schematic side view of a device enclosure according to one preferred embodiment of this invention.
Figure 11:
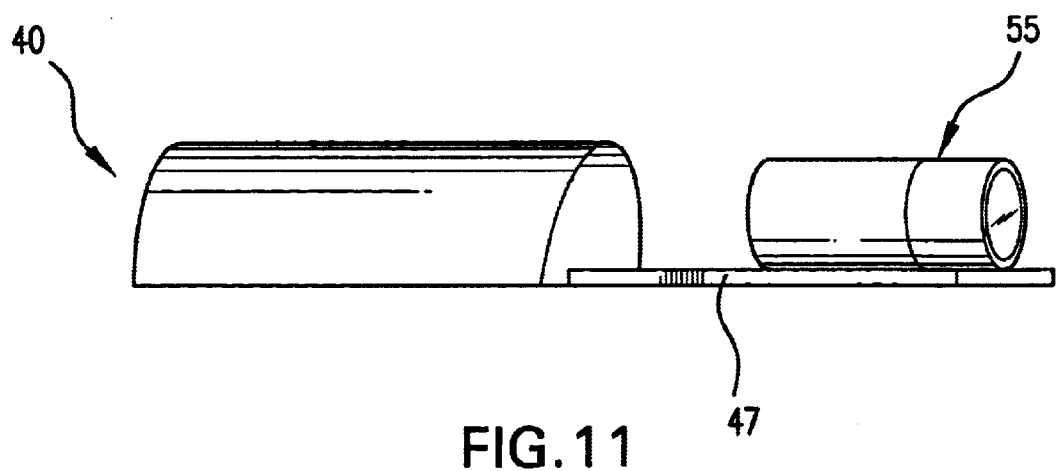
FIG. 11 is a schematic side view of a device enclosure according to one preferred embodiment of this invention.

According to one preferred embodiment of this invention such as shown schematically in FIG. 10, two devices 50 are positioned within device enclosure, each device of the two devices positioned in an end of the device enclosure. In one specific construction of this embodiment, a daylight camera 55 having a standard lens is positioned in one end of device enclosure 40 and a second night-vision camera 55' having a night-vision lens is positioned in an opposite end of device enclosure 40. In such a manner, 24 hour surveillance may effected by rotating device enclosure 40 180 degrees at dusk to position the night-vision lens outward and again at dawn to position the standard lens outward. Such an arrangement may have similar application with any number of devices 50 that may work in connection with each other. Such arrangement is not limited to two devices 50 and may include numerous devices positioned in a wheel-like arrangement.

While in the foregoing specification this invention has been described in relation to certain preferred embodiments thereof, and many details have been set forth for purpose of illustration, it will be apparent to those skilled in the art that the pan and tilt unit according to this invention is susceptible to additional embodiments and that certain of the details described herein can be varied considerably without departing from the basic principles of the invention.

We claim:

1. A pan and tilt unit comprising:
   a housing;
   a platform connected to the housing, the platform for accommodating a device;
   a drive system positioned within the housing adapted to move the platform in a desired direction; and
   a control system positioned within the housing in communication with the drive system and the device to append an internal operation protocol to a device operation protocol thereby permitting operation to the device by the pan and tilt unit.

2. The pan and tilt unit of claim 1 wherein the device is a camera.

3. The pan and tilt unit of claim 1 wherein the control system further comprises:
   an integrated programmable control system that stores one or more predetermined tours for moving the device in a desired sequence of motion.

4. The pan and tilt unit of claim 1 wherein the control system appends a prefix and a suffix to the device operation protocol to permit communication with the device.

5. The pan and tilt unit of claim 1 wherein the control system comprises:
   an internal motor driver positioned within the housing.

6. The pan and tilt unit of claim 1 wherein the control system comprises:
   four internal motor drivers positioned within the housing.

7. The pan and tilt unit of claim 6 wherein the four internal motor drivers comprise:
   a pan motor driver for controlling the pan and tilt unit in a pan direction;
   a tilt motor driver for controlling the pan and tilt unit in a tilt direction;
   a zoom motor driver for controlling magnification of a lens of the device; and
   a focus motor driver for controlling focus of the lens of the device.

8. The pan and tilt unit of claim 1 further comprising:
a device enclosure positioned on the platform for accommodating the device.

9. The pan and tilt unit of claim 8 further comprising:
a universal mounting mechanism within the device enclosure.

10. The pan and tilt unit of claim 8 further comprising:
two devices positioned within the device enclosure, each device of the two devices positioned in an end of the device enclosure.

11. The pan and tilt unit of claim 8 further comprising:
a camera having a standard lens positioned in one end of the device enclosure; and
a camera having a night-vision lens positioned in an opposite end of the device enclosure.

12. The pan and tilt unit of claim 8 further comprising:
a slideable shelf positioned within the device enclosure, the slideable shelf fully extendible outside of the device enclosure.

13. The pan and tilt unit of claim 8 further comprising:
a socket integrated within the device enclosure, the socket connectable with the device upon placement of the device within the device enclosure.

14. The pan and tilt unit of claim 8 further comprising:
a blower positioned within the device enclosure, the blower generating an air screen across an output end of the device enclosure.

15. The pan and tilt unit of claim 14 further comprising:
an intake air filter positioned within the device enclosure at an opposite end of the device enclosure from the blower.

16. The pan and tilt unit of claim 1 wherein the drive system comprises at least one worm gear.

17. The pan and tilt unit of claim 1 further comprising:
an encoder positioned within the housing, the encoder maintaining a constant reference position of the pan and tilt unit.

18. The pan and tilt unit of claim 1 further comprising:
a shroud positioned over the platform, the shroud concealing all wiring between the housing and the platform.

19. A pan and tilt unit comprising:
a platform for accommodating a camera;
a housing connected to the platform;
a drive system positioned within the housing adapted to move the platform in a desired direction;
a plurality of drivers positioned within the housing in communication with the drive system and the camera to append an internal operation protocol to a camera operation protocol thereby permitting operation of the camera by the pan and tilt unit.

20. The pan and tilt unit of claim 19 wherein the plurality of drivers comprise:
a pan motor driver for controlling the pan and tilt unit in a pan direction;
a tilt motor driver for controlling the pan and tilt unit in a tilt direction;
a zoom motor driver for controlling magnification of a lens of the camera; and
a focus motor driver for controlling focus of the lens of the camera.

21. A method of operation of a pan and tilt unit comprising the steps of:
positioning a camera on a platform of the pan and tilt unit;
connecting the camera to a control system within the pan and tilt unit;
providing an instruction to the control system with a pan and tilt protocol;
appending the instruction with a camera protocol within the control system;
routing the instruction from the control system to the camera without the pan and tilt protocol; and
executing the instruction.

22. The method of operation of the pan and tilt unit according to claim 21 further comprising:
controlling the pan and tilt unit in a pan direction with an internal pan driver motor; and
controlling the pan and tilt unit in a tilt direction with an internal tilt motor driver.

23. The method of operation of the pan and tilt unit according to claim 21 further comprising:
controlling the magnification of the camera with an internal zoom motor driver; and
controlling the focus of the camera with an internal focus motor driver.

24. A pan and tilt unit comprising:
a housing;
a platform connected to the housing, the platform for accommodating a device;
a device enclosure positioned on the platform for accommodating the device;
a drive system positioned within the housing adapted to move the platform in a desired direction, the drive system including at least one worm gear for moving the platform; and
a control system positioned within the housing in communication with the drive system and the device, wherein the control system appends an internal operation protocol to a device operation protocol thereby permitting operation of the device by the pan and tilt unit.

25. The pan and tilt unit of claim 24 wherein the control system appends a prefix and a suffix to the device operation protocol to permit communication with the device.

26. The pan and tilt unit of claim 24 wherein the control system comprises:
four internal motor drivers positioned within the housing.

27. The pan and tilt unit of claim 26 wherein the four internal motor drivers comprise:
a pan motor driver for controlling the pan and tilt unit in a pan direction;
a tilt motor driver for controlling the pan and tilt unit in a tilt direction;
a zoom motor driver for controlling magnification of a lens of the device; and
a focus motor driver for controlling focus of the lens of the device.

28. The pan and tilt unit of claim 24 further comprising:
a universal mounting mechanism within the device enclosure.

29. The pan and tilt unit of claim 24 further comprising:
two devices positioned within the device enclosure, each device of the two devices positioned in an end of the device enclosure.

30. The pan and tilt unit of claim 24 further comprising:
a camera having a standard lens positioned in one end of the device enclosure; and a camera having a night-vision lens positioned in an opposite end of the device enclosure.

31. The pan and tilt unit of claim 24 further comprising:
a slideable shelf positioned within the device enclosure, the slideable shelf fully extendible outside of the device enclosure.

32. The pan and tilt unit of claim 24 further comprising:
a socket integrated within the device enclosure, the socket connectable with the device upon placement of the device within the device enclosure.

33. The pan and tilt unit of claim 24 further comprising:
a blower positioned within the device enclosure, the blower generating an air screen across an output end of the device enclosure.

34. The pan and tilt unit of claim 33 further comprising:
a filter positioned within the device enclosure at an opposite end of the device enclosure from the blower.

35. The pan and tilt unit of claim 24 further comprising:
an encoder positioned within the housing, the encoder maintaining a constant reference position of the pan and tilt unit.

36. The pan and tilt unit of claim 24 further comprising:
a shroud positioned over the platform, the shroud concealing all wiring between the housing and the platform.

* * * * *